United States Patent [19]
Hoadley

[11] 3,714,534
[45] Jan. 30, 1973

[54] ELECTRICAL MOTOR-DAMPING CIRCUIT FOR A SELF-POSITIONING SYSTEM

[75] Inventor: Harvey Orlo Hoadley, Rochester, N.Y.

[73] Assignee: Eastman Kodak Company, Rochester, N.Y.

[22] Filed: May 3, 1971

[21] Appl. No.: 139,329

[52] U.S. Cl.................................318/368, 318/380
[51] Int. Cl...............................................H02p 3/08
[58] Field of Search......318/368, 380, 300, 289, 612, 318/258, 26, 331, 342, 345

[56] References Cited

UNITED STATES PATENTS 2,965,827 12/1960 Hohne, Jr............................318/380
3,184,670 5/1965 Reynolds.............................318/300

Primary Examiner—Gene Z. Rubinson
Attorney—Robert W. Hampton, Paul R. Holmes and Robert W. Weig

[57] ABSTRACT

A damping circuit for a DC motor. Driving the motor is a half-wave rectified current from an AC power source. A transistor and isolating diode are connected across the motor terminals. The base of the transistor is connected through a resistor to the output of the AC power source so that during the half cycles the motor is not driven the transistor is turned on to short-circuit the back voltage from the motor due to armature rotation. The drag produced on the armature is proportional to its rotational velocity and therefore equivalent to hydraulic damping but less expensive and simpler. One such transistor circuit is used for each of the two directions of motor travel in a servo system such as used in automatic focusing projectors.

7 Claims, 5 Drawing Figures

HARVEY ORLO HOADLEY
INVENTOR.

BY Robert W. Weig

AGENT

HARVEY ORLO HOADLEY
INVENTOR.

BY Robert W. Weig

AGENT

HARVEY ORLO HOADLEY
INVENTOR.

BY Robert W. Weig

AGENT

ELECTRICAL MOTOR-DAMPING CIRCUIT FOR A SELF-POSITIONING SYSTEM

FIELD OF THE INVENTION

The invention relates to a damping circuit for an electric motor and, more particularly, to a damping circuit for a bidirectional DC electrical motor in a self-positioning servo system, e.g., such as is used in a focusing type projector.

BACKGROUND OF THE INVENTION

Reference is made to commonly assigned copending U. S. patent application Ser. No. 139,328., entitled, "Servo Amplifier for a Self-Positioning System", filed in the name of the present inventor, Harvey Orlo Hoadley, on May 3, 1971 concurrently with this application.

Typically, a self-focusing slide or motion picture projector has a source of light which is condensed by a lens system to evenly illuminate a photographic transparency, the image of which is projected for viewing upon a screen through a movable objective lens. Customarily, the viewing screen is at a fixed distance and incremental changes are automatically made in the distance from the slide transparency to the objective lens to accommodate various spurious conditions in the surface of the slide transparency resulting either from the thermal environment surrounding the slide transparency, or from the inherent defects in the slide transparency, or its frame. Usually, it is the objective lens which is displaced along the optical axis of the system by a motor driven device to change the focal distance to the object plane in order to optimally focus the image on the viewing screen. Several prior art devices which accommodate the spurious changes in the slide transparency to automatically maintain the focus of the image on the viewing screen in this manner are available.

Exemplary of such systems is that disclosed in U. S. Pat. No. 3,249,001 to Stauffer which shows a pair of photoelectric cells which, when the projector is properly focused, are substantially equally illuminated by an image of reflected light from the slide. If the slide transparency is displaced from its position of optimal focus, one of the photocells has more light falling on its receiving surface than does the other. An electrical signal is derived from this condition of unbalanced photocell illumination which is a function of the effective transparency position and a reversible DC motor moves the objective lens and the photocells together in the appropriate direction along the optical axis of the system to reposition them until the reflected light from the transparency is evenly distributed on the photocells once again, thus indicating the transparency image is in focus on the viewing screen.

Another such system is that disclosed by U. S. Pat. No. 3,466,125 to Kottler. This system utilizes a slide projector having first and second focal distances defined on opposite sides of an objective lens. The first focal distance is between the slide and the pilot image and the second focal distance is between the objective lens and the viewing screen. A bridge having two resistive arms is operatively connected to a photodetector which receives radiant energy from the pilot image. The photodetector provides a null when the photographic slide is in the optimum position which provides a well-focused image on the display screen. The bridge, in response to the photodetector, controls the amount of compensatory movement provided by a DC motor to reposition the slide if it is incrementally out of position in either direction due to one of the above-mentioned defects in the slide or due to the thermal environment.

Typically, prior art self-positioning systems are not ideally damped. Some systems, such as that described in U. S. Pat. No. 3,466,125, provide an inherent form of damping. Such a reliance can leave an unadjustable, relatively large, electrical "dead zone" intrinsic within the system. If this is the case, the "correct" position of focus effectively spans a relatively long increment on the optical axis of the system and is therefore relatively imprecise, resulting in poorer automatic focusing than that provided with the aid of the present invention. Too, a relatively large error signal is necessary to actuate this correctional movement in self-positioning prior art systems which, naturally, allows slight out-of-focus conditions to go uncorrected.

The before-mentioned cofiled application in the name of Harvey Orlo Hoadley describes an amplifier in which the dead zone can be greatly reduced or eliminated, and the focusing of the slide is therefore much more precise. However, the reduction of the dead zone greatly increases the tendency of the servo system to "hunt." Hunting is countered by applying to the servo motor a drag which is proportional to its velocity. Such a drag is known as damping, and may be provided by hydraulic or viscous means. The present invention provides an electrical means for applying damping, which is simpler and cheaper than hydraulic or viscous damping.

One object of the present invention is to provide electrical damping substantially as effective as hydraulic or viscous damping for a self-positioning system.

Another object of the present invention is to provide electrical damping to a self-focusing apparatus to eliminate constant "hunting" oscillation in such a system.

Still another object of the present invention is to provide an electrical damping circuit which may be used in existing projectors having automatic-focusing devices with minimal modifications thereto.

One advantage of the present invention is that electrical damping is relatively simpler and cheaper than hydraulic or viscous damping in systems of the type to which the invention is adapted.

Another advantage of the present invention is that it provides electrical damping which is substantially equivalent to hydraulic or viscous damping to servo-amplifier systems in self-focusing projector and other apparatus to achieve accurate stops for the motor drive element at the desired optimum position.

SUMMARY OF THE INVENTION

The instant invention relates to an electrical damping circuit which is readily adapted to the self-positioning system disclosed in the cofiled U. S. Pat. No. application Ser. No. 139,328 to the present inventor. The invention can also be used with various prior art automatic self-positioning servo-amplifier driven devices or other servo-amplifier applications with improved results therewith.

In accordance with the invention, when a DC motor is driven by a half-wave rectified current from an AC power source, a transistor and isolating diode are connected across the motor terminals with the transistor base being connected through a suitable resistor to the far side of the power source such that, during the half-cycle when the motor is not being driven, the transistor is turned on to short-circuit the back voltage developed in the motor by the rotation of the armature. Consequently, drag on the motor armature is proportional to the rotational velocity thereof and, hence, substantially equivalent to hydraulic or viscous damping. In circuits where the DC motor can be driven in two directions, such as the servo system of the mentioned cofiled U. S. patent application and other self-positioning systems, a pair of complementary transistors can be used to provide damping for both directions of travel of the motor.

BRIEF DESCRIPTION OF THE DRAWINGS

Other objects and advantages of the invention will become apparent upon reading the following detailed de-scription and upon reference to the drawings in which.

Figure 1A:
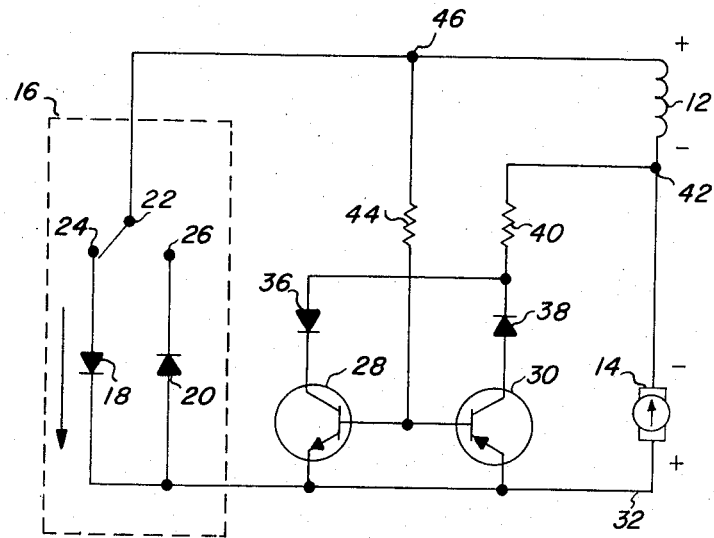
FIG. 1A is a schematic showing of the invention in forward drive half-cycle.

While the invention will be described in connection with a preferred embodiment thereof, it is to be understood that it is not intended to limit the invention to that embodiment.

DESCRIPTION OF THE PREFERRED EMBODIMENT OF THE INVENTION

Referring to FIGS. 1A–1D, a damping circuit in accordance with the invention is shown. An AC source 12 drives a bidirectional DC motor 14 through either one of two rectifying circuits within broken line outline 16. The rectifying circuit allowing current to run in a clockwise (CW) or forward direction through motor 14 is represented by diode 18. The other rectifying circuit allows current to run counterclockwise (CCW) or in the reverse direction through motor 14 and is represented by diode 20. A switching means which for purposes of simplicity is represented by a manual switch 22 alternately engages the CW rectifying circuit through pole 24 and the CCW rectifying circuit through pole 26. As will be revealed later herein with reference to FIG. 2, direction controlling circuit 16 is preferably a servo-amplifier system such as that disclosed in the aforementioned patent application in the name of the inventor herein or other such system. Connected with bases in common and emitters in common with pole 32 of motor 14 are NPN transistor 28 and PNP transistor 30. The collector of transistor 28 is common to the cathode of diode 36 and the collector of transistor 30 is common to the anode of diode 38. The anode of diode 36 and the cathode of diode 38 are in electrical common and are connected through a resistance 40 to the common connection 42 between motor 14 and AC power source 12. The bases of transistors 28 and 30 are connected through resistance 44 to the other output of AC source 12 at point 46.

In FIG. 1A, the forward drive half-cycle for the DC motor is shown. Switch 22 is in position against pole 24 directing current through the CW circuit represented by diode 18. As illustrated, power source 12 is in the half-cycle when point 46 is positive, relative to pole 42. In this position, drive current flows through diode 18 and from there through motor 14 from pole 32 to pole 42. Isolating diode 36 prevents the drive voltage from being short-circuited through resistor 40 by way of the forward-biased base-emitter junction of transistor 30 of the base-collector junction of transistor 28. Negative voltage appears on the collector of transistor 30 but no collector current flows because the base of transistor 30 is essentially at the same voltage as its emitter, or even reverse-biased if there is an appreciable voltage drop in the direction-controlling circuit 16.

Figure 1B:
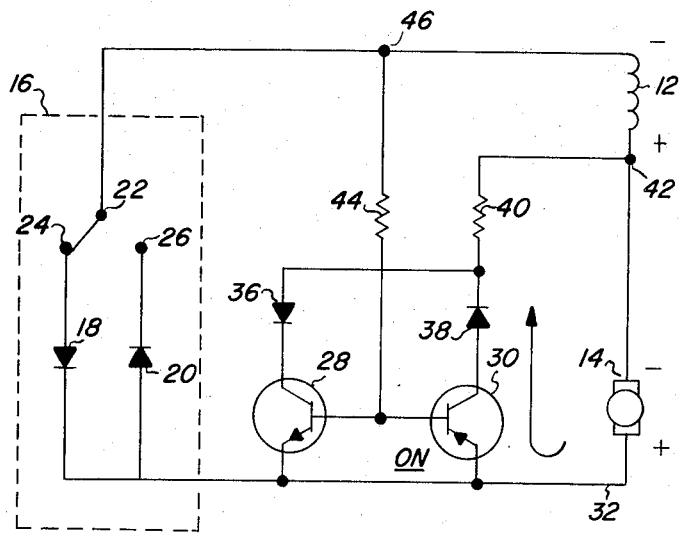
FIG. 1B is a schematic showing of the invention in forward damp half-cycle.

Reference is now made to FIG. 1B, which illustrates how the motor 14 is damped during the opposite half-cycle of the power source 12. Switch 22 remains against pole 24. The back voltage appearing across the terminals of motor 14, by reason of the motor's armature continuing to turn due to inertia, has the same polarity as the voltage which was applied to drive it. The voltage appearing between points 46 and 32 is equal to the sum of the motor back voltage and the instantaneous value of the source voltage and has the proper polarity to draw base current from transistor 30, thereby turning transistor 30 on to conduct collector current. The terminals of motor 14 are then shunted by transistor 30, diode 38, and resistor 40. The effect of the heavy shunt current is to apply a mechanical drag to the armature of the motor 14, proportional to its inertial velocity.

Figure 1C:
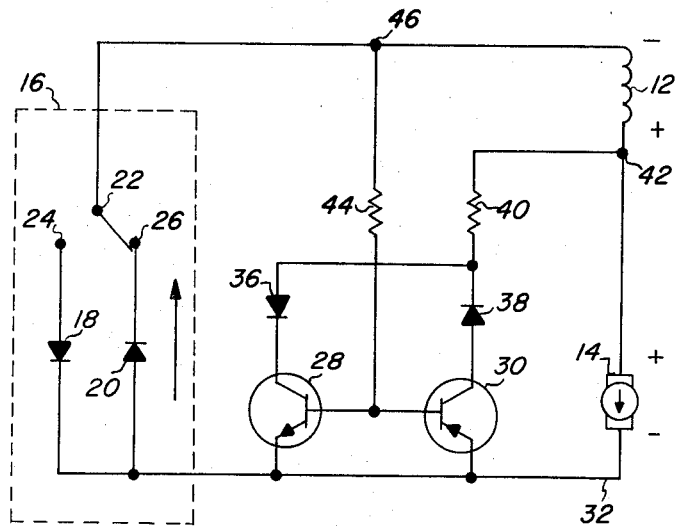
FIG. 1C is a schematic showing of the invention in reverse drive half-cycle.
Figure 1D:
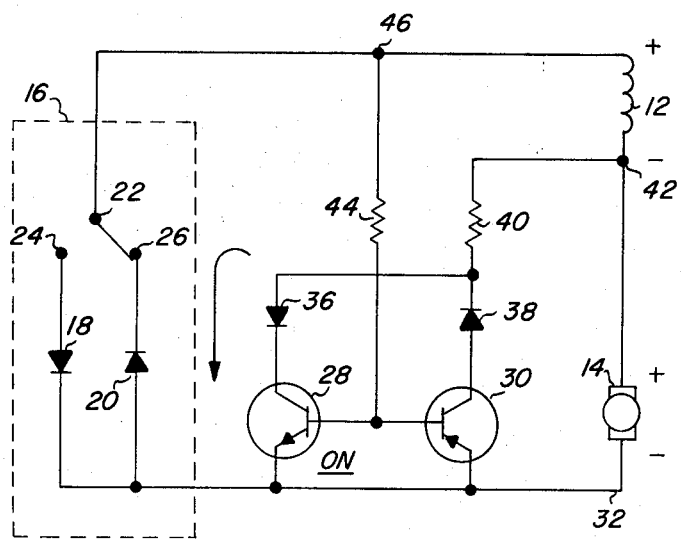
FIG. 1D is a schematic showing of the invention in reverse damp half-cycle.

The conditions which exist when the motor 14 is being driven in the direction opposite to that represented in FIGS. 1A and 1B are illustrated in FIGS. 1C and 1D. With the current directional control switch 22 thrown to its other position against pole 26, and during the half-cycle when terminal 46 of the AC power source 12 is negative from point 42 as shown in FIG. 1C, drive current flows through the motor 14 from point 42 to point 32, in the opposite direction from that shown in FIGS. 1A and 1B, and back to the power source 12 through diode 20. Diode 38 prevents the drive voltage from being shorted out through the base-collector junction of transistor 30 and the base-emitter junction of transistor 28. Transistor 28 does not conduct collector current because its base is held at the same potential as, or slightly negative from, its emitter.

During the opposite half-cycle of the power source voltage as shown by FIG. 1D, with switch 22 still closed to pole 26, the source voltage added to the motor back voltage, if any, has the proper polarity to furnish base current to transistor 28 and thereby enable it to conduct collector current. The motor back voltage is then shunted by the low-impedance path comprising resistor 40, diode 36, and transistor 28.

Maximum damping current is obtained when resistor 40 is equal to zero and either one of transistors 28 or 30 is turned on to saturation. The damping current is then limited only by the internal impedance of the windings of motor 14. It could be decreased from this value by increasing resistance 44 to reduce the base current to the transistors 28 and 30. In this case, to get a given amount of damping and to have the damping the same for both directions of travel, the current gains of the two transistors 28 and 30 are matched and then resistance 44 is selected to match the actual value of current gain. It has been found to be preferable to make the base current high enough to saturate both transistors, even if they have the minimum value of current gain for their type, and to select the value of resistance 40 for the desired amount of damping.

Figure 2:
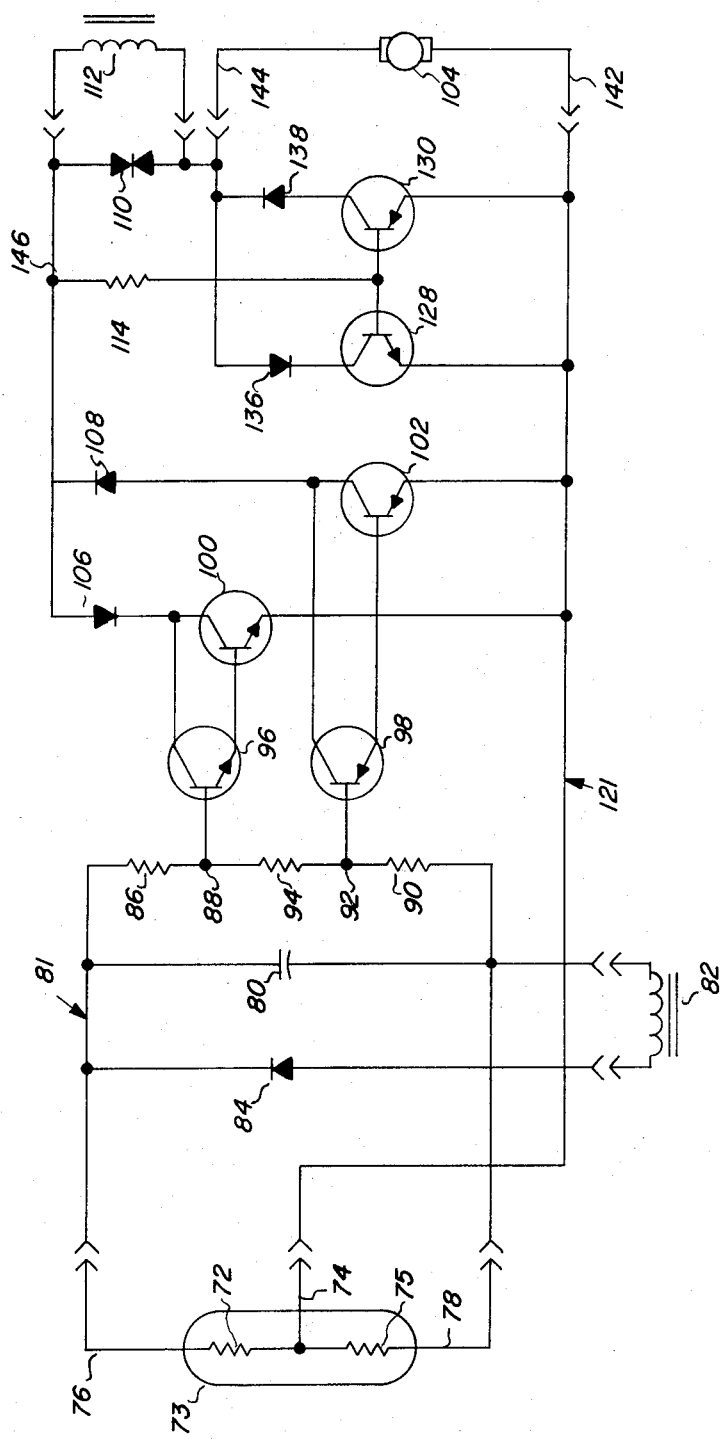
FIG. 2 is a schematic showing of the present invention utilized in conjunction with the self-focusing servo system of Ser. No. 139,328 to the present inventor cofiled with the present application and which is adapted for use in a self-focusing projector.

Referring now to FIG. 2, shown therein is a schematic of the present invention utilized in conjunction with the self-focusing servo system disclosed in cofiled U. S. Pat. application Ser. No. 139,328, filed in the name of Harvey O. Hoadley, the present inventor.

A bridge circuit generally designated 81 has a DC supply potential comprising AC source 82, rectifier diode 84, and filter capacitor 80. One side comprises the two light receiving sections 73 and 75 of the dual photoconductive cell 72. The other side of the bridge 81 comprises three resistors 86, 94, and 90 in series, with junction points designated 88 and 92, respectively.

If, as is more particularly shown in FIG. 1 of the cofiled application above-mentioned, position representative light falls equally on the two halves 73 and 75 of the photoconductive cell 72 so that their resistances are equal, and the two resistors 86 and 90 are selected to be equal, then the potential of the junction point 74 between the two sections 73 and 75 of the photoconductive cell 72 lies halfway between the potentials of the junction points 88 and 92 on the other side of the bridge 81. The potential difference between points 88 and 92 is selectively controlled by the value of resistor 92 relative to the values of resistors 86 and 90. This network provides discrete signal transfer channels for clockwise (CW) and counterclockwise (CCW) rotation of reversible DC motor 104. For the purpose of clarity, these channels are arbitrarily designated channel A for CW rotation and channel B for CCW rotation.

Transistor network generally designated 95 includes four transistors, the two of the NPN type identified as 96 and 100 and two PNP type referred to as 98 and 102.

It will be appreciated that the two control transistors are of oppositely polarity. That is, transistor 102 is of the PNP variety, whereas transistor 100 is an NPN type. Furthermore, control transistors 100 and 102 are in series with corresponding diodes 106 and 108. Also, the two transistor diode pairs comprising channels C and D are in parallel relative to the motor circuit.

Bridge circuit 81 is interconnected with the transistor network 95 by connecting the bases of transistors 96 and 98 to resistor junctions 88 and 92, respectively, and connecting the common terminal 74 of the two photoconductive cell sections 73 and 75 to the common junction between the emitters of transistors 100 and 102. When the position representative light beam incident on the dual photoconductive cell 72 shifts in one direction from the central position, the photoconductive cell unbalances such that the voltage at terminal 74 becomes even more negative relative to junction 88 and base current flows from point 88 to point 74 through the base-emitter junctions of transistors 96 and 100, thus causing transistor 100 to conduct collector current. Current from the power source can then flow through the motor by way of channel A. During the half-cycle of the AC power source 112 that the potential at terminal 114 is positive relative to terminal 116, the DC motor 104 is driven clockwise by current flowing through diode 106 and transistor 100. Diode 108 prevents a forward bias from being applied to the collector-base junctions of transistors 98 and 102 during this half-cycle of the power source.

Conversely, when the light beam shifts in the opposite direction, the voltage at point 74 goes positive from the balance point and base current flows from point 74 through the base-emitter junctions of transistors 102 and 98 to point 92, thus allowing transistor 102 to conduct collector current. Then, during the half-cycle when terminal 114 of the power source is negative from terminal 116, the DC motor 104 is driven counterclockwise by drive current flowing through channel B from terminal 116 through the motor and then through transistor 102 and diode 108 to terminal 114. Diode 106 prevents forward bias from being applied to the base-collector junctions of transistors 96 and 100 during this half-cycle of the power, when transistor 102 is not conducting.

As above pointed out, by suitably selecting resistors 94, 86 and 90, the bases of transistors 96 and 98 can be held apart by approximately the combined forward voltage drop of the base-emitter junctions of all four transistors, so that only a slight change in the voltage at point 74 of the photoconductive cell 72 in one direction or the other is sufficient to turn on one or the other of the control transistors. If the resistance of resistor 94 is increased in value, a small alternating current can be made to flow through the DC motor 104 when the system is in balance. This produces no net displacement of the DC motor, but the motor is constantly vibrated or jogged which is useful in reducing the standing friction in the mechanical components of the system. Thus, no great surge of current is needed to start the motor turning.

In addition, it may at times be desirable in other applications to increase the electrical dead zone. In situations where the intrinsic dead zone, when the bases of transistors 96 and 98 are at the same voltage, is insufficient, one need only connect the base of transistor 96 to junction 92 and the base of transistor 98 to junction 88.

Thyrector diode 110 is connected across the terminals of AC source 112 to eliminate transient voltage. Resistance 114 corresponding to resistaNce 44 in FIGS. 1A–1D is connected between the electrically common bases of transistors 128 and 130 and point 146.

A description of the operation of this circuit is completely given in the above-mentioned copending application and reference can be made to that application for a complete understanding of the operation of the circuit.

As can be seen by referring to FIGS. 1A–1D, and in FIG. 2, transistors 128 and 130, and diodes 136 and 138 correspond to transistors 28 and 30 and diodes 36 and 38, respectively; DC motor 104 and AC source 112 correspond to motor 14 and AC source 12; and channels A and B of network 181 correspond to diodes 18 and 20 operating with manual switch 22 having poles 24 and 26 in circuit 16.

In the forward drive half-cycle of power source 112, drive current runs through channel A, diode 106, transistor 100 and from point 142 through the motor 104 to point 144. Isolating diode 136 prevents the drive voltage from being impressed across transistor 128 with the wrong polarity.

For the forward damping half-cycle of the AC power source 112, transistor 130 is turned on. Hence, transistor 130 and diode 138 furnish a low-impedance path to short out any back voltage developed across the motor 104 by CW rotation of the armature.

When drive current flows through the motor through channel B and from point 144 to 142, the AC power source 112 is in the half-cycle where point 146 is negative from point 144 and the isolating diode 138 protects transistor 130 from the application of voltage of the wrong polarity.

During the opposite half-cycle, transistor 128 is turned on to provide a low-impedance shunt for the back voltage developed across the motor 104 by rotation of the armature in the CCW direction.

In operation as incorporated within the self-focusing system of a projector, when a transparency is displaced relative to a position for optimum focus along the optical axis, unequal amounts of light fall on the two photoelectric receiving surfaces 73 and 75 which causes either channel A or channel B to operate the motor 104 in a CW or CCW direction, depending on which way the transparency is displaced from its position for optimum focus. The motor 104 is damped in accordance with the present invention, to bring the transparency to a stop relative to the objective lens at the position for optimum focus within very small error tolerances.

The invention is not limited to use within self-focusing devices in slide projectors, but may be incorporated in other optical devices such as moving picture projectors, television systems, microscopes and other devices utilizing self-positioning systems. Such uses will be readily apparent to those of ordinary skill in the art.

It will be appreciated that both the improved amplifier of the cofiled application in the name of the present inventor and the electrical damping circuit of this invention are applicable to servo systems where an unbalanced condition is detected by a change of one or more resistances in a bridge circuit, and a motor is driven in one direction or the other to restore a balanced condition. The variable arms in the bridge need not be phototransducers, but can be slide-wire, strain gauge, or other such devices, or series of devices whereby the rotation of a motor reversibly produces a resistance change in the bridge circuit.

This invention has been described in detail with particular reference to preferred embodiments thereof, but it will be understood that variations and modifications can be effected within the spirit and scope of the invention.

I claim:

1. A damping circuit for a DC motor having terminals, windings and a rotatable armature and driven by a half-wave rectified current applied at the terminals from an AC power source, comprising:
    means for sensing half-cycles of the power source when said motor armature is rotating and undriven;
    means responsive to said sensing means for applying to the terminals current from said AC source and associated with the back voltage developed by said windings to damp said motor proportionally to the rotational velocity of said armature.

2. The invention of claim 1 wherein said applying means comprises at least one transistor.

3. The invention of claim 1 wherein said applying means comprises at least one transistor and said sensing means comprises current direction limiting means.

4. The invention of claim 1 wherein said applying means comprises two transistors and said sensing means comprises current direction limiting means associated on a one-to-one basis with said transistors, respectively, such that one said transistor and associated current direction limiting means is operative to damp said motor when said armature is rotating in one direction and said other transistor and associated current direction limiting means is operative to damp said motor when said armature is rotating in said other direction.

5. A damping circuit for a bidirectional DC motor having terminals, windings, and a rotatable armature and driven in either direction by a half-wave rectified AC current from an AC power source applied at the terminals, comprising:
    means for sensing the direction of rotation of said armature and half-cycles of the rectified current when said motor is rotating and undriven;
    means responsive to said sensing means comprising two channels, one associated with clockwise and the other associated with counterclockwise rotation of said armature for applying through said channels to the terminals current from said AC source associated with the back voltage developed by said windings to damp said motor proportionally to the rotational velocity of said armature.

6. The invention of claim 5 wherein said channels comprise:
    at least two transistors operated at saturation; and
    impedance means for applying a selected amount of damping.

7. The invention of claim 5 wherein said channels comprise:
    selected impedance means for introducing a selected amount of damping, and
    two gain-matched transistors such that for one direction of motor armature rotation damping is applied to the motor through said impedance means by one of said transistors and for the other direction of motor armature rotation damping is applied to the motor through said impedance means by said other transistor.

* * * * *